Figure 1:
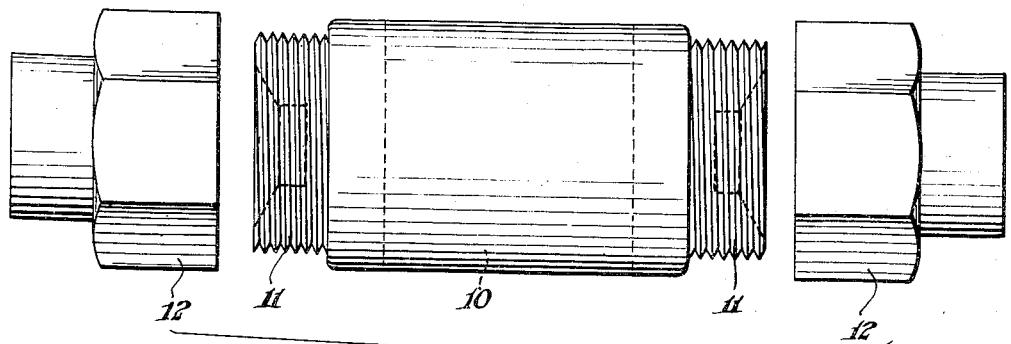

Jan. 9, 1951  W. FERGUSON  2,537,451
SAFETY NIPPLE FOR PIPE LINES
Filed Dec. 1, 1945

Inventor
William Ferguson,
By [signature]
Attorney.

Patented Jan. 9, 1951

2,537,451

UNITED STATES PATENT OFFICE 2,537,451

SAFETY NIPPLE FOR PIPE LINES

William Ferguson, Philadelphia, Pa.

Application December 1, 1945, Serial No. 632,235

1 Claim. (Cl. 138—89)

My invention relates to improvements in safety devices for pipe lines. The object is to provide interchangeable nipples for securing together adjacent pipe ends.

In factories, refineries, industrial plants, etc. where high pressure and frequently low pressure gas is used as boiler or process fuel, it is customary to consider certain safety precautions tending to avoid the all too common furnace explosions.

Most of these explosions occur due to a leaking or unintentionally opened fuel gas valve causing an accumulation of gas with air in a cold furnace, which may be subsequently ignited by a stray spark, or often by a hand torch with disastrous results.

It is general practice first to install double gas shut-off valves in series before the gas burner or, second, to insert a blank disc and extra gaskets between the faces of flanged unions at the same location.

The first is not positive because of the possibility of both valves leaking simultaneously or being accidentally opened. The second is positive, but is rather troublesome and is slower routine, especially in the smaller sizes as ¼" to 3" pipe sizes. I therefore provide means to improve on the second method at the same time adding some desirable and convenient features in the same device.

This device may also be advantageously used in numerous industries for fluid lines, such as blanking off oil lines to oil burners in all industries; oil lines to storage tanks, stills and process equipment in petroleum refineries; ammonia liquid and gases or other refrigerants in refrigerating plants; high and low pressure steam and compressed air lines all industries; hydraulic pressure lines all industries; and acids, gasoline, explosive chemicals, and in the chemical and petroleum industries.

Figure 2:
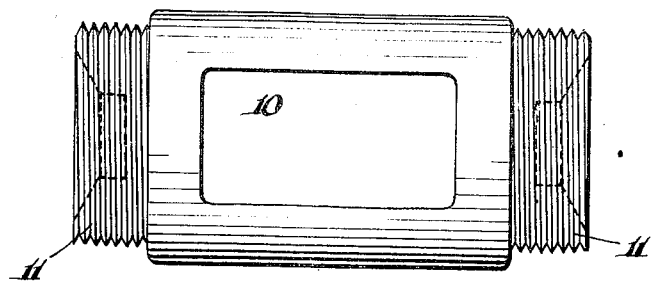
Figure 3:
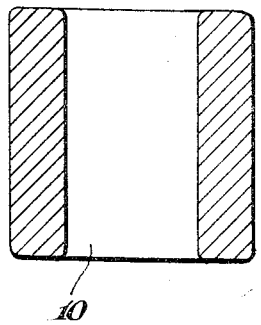

Referring to the drawings, which illustrate merely by way of example, a suitable embodiment of the invention:

Fig. 1 is a side elevation of a blank nipple.
Fig. 2 is a top or plan view of same.
Fig. 3 is a section on line 3—3 of Fig. 2.

Similar numerals refer to similar parts throughout the several views.

The safety device shown in Figs. 1, 2 and 3 is referred to as a "blank" nipple as the same is not provided with any longitudinal passage therethrough. The open space or recess 10 between the two ends has no connection with the bore of the pipe line. This nipple is provided with threaded ends for connection into the pipe line by the coupling elements 12 which are connected to the spaced contiguous ends of the pipe line.

With this nipple temporarily installed in the gas line to the burner, it will prevent any gas from leaking into the furnace even though the gas valves are opened wide.

When it is desired that fluid be allowed to flow, the "blank" nipple is removed and a "live" nipple installed by means of the same unions 12.

The "blank" nipple may be cast or otherwise made with the word "blank" "blind" "dead" "shut" "off" or some other word synonymous with no flow, appearing in distinct letters. It may also be appropriately colored in back ground with white or green paint or enamel. The opening 10 in the nipple is for lightening the piece and also to prevent its being drilled and then used as a live nipple. This opening 10 can be utilized to receive the stem of a sign that could indicate from some distance that the blank is installed, but in itself serves as an indicator that flow through the nipple is prevented.

What I claim is:

A safety nipple for insertion between ends of a fluid pipe line during repair operations comprising a body portion with solid ends for connection to the pipe line, said ends closing access from said pipe ends, said body between said solid ends being provided with a transverse opening therethrough for indicating the obstruction of fluid flow through the nipple.

WILLIAM FERGUSON.

REFERENCES CITED

The following references are of record in the file of this patent:

UNITED STATES PATENTS

| Number | Name | Date |
|---|---|---|
| 658,313 | Bernardi | Sept. 18, 1900 |
| 1,580,558 | McLaine | Apr. 13, 1926 |
| 1,744,842 | Suverkrop et al. | Jan. 28, 1930 |
| 1,971,159 | Laurent | Aug. 21, 1934 |
| 2,024,215 | Gillette et al. | Dec. 17, 1935 |
| 2,200,500 | Hinrichs | May 14, 1940 |
| 2,242,467 | Hamer | May 20, 1941 |